United States Patent [19]

Mitchell

[11] 4,080,284

[45] Mar. 21, 1978

[54] HYDROCARBON CONVERSION WITH MODIFIED SOLID CATALYST MATERIALS

[75] Inventor: Thomas Owen Mitchell, Trenton, N.J.

[73] Assignee: Mobil Oil Corporation, New York, N.Y.

[21] Appl. No.: 753,237

[22] Filed: Dec. 22, 1976

Related U.S. Application Data

[60] Continuation of Ser. No. 675,849, Apr. 12, 1976, abandoned, which is a division of Ser. No. 501,323, Aug. 28, 1974, Pat. No. 3,980,586.

[51] Int. Cl.$^2$ .................. C10G 13/02; C10G 11/04; B01J 29/12
[52] U.S. Cl. .................. 208/111; 208/120; 252/451; 252/455 R; 252/455 Z
[58] Field of Search .................. 208/111, 120; 252/455 R, 455 Z

[56] References Cited

U.S. PATENT DOCUMENTS

| | | | |
|---|---|---|---|
| 2,722,504 | 11/1955 | Fleck | 208/110 |
| 3,140,253 | 7/1964 | Plank et al. | 208/120 |
| 3,437,587 | 4/1969 | Ellert et al. | 208/120 |
| 3,661,770 | 5/1972 | Givens | 260/683.68 |
| 3,682,996 | 8/1972 | Kerr | 260/448 C |
| 3,698,157 | 10/1972 | Allen et al. | 55/67 |
| 4,013,589 | 3/1977 | Buonomo et al. | 252/455 R |

*Primary Examiner*—Delbert E. Gantz
*Assistant Examiner*—G. E. Schmitkons
*Attorney, Agent, or Firm*—Charles A. Huggett; Dennis P. Santini

[57] ABSTRACT

Organic compound conversion in the presence of refractory metal oxide solid materials, characterized by the presence of surface hydroxyl groups, which have undergone modification by being subjected to the sequential steps of (1) silylating, (2) calcining and (3) steaming is provided. The silylating step in the modification of the refractory materials is accomplished by contacting the solid material with an organic- or halogen-substituted silane at a temperature of between about 25° C and about 500° C to effect bonding between the silane and the surface hydroxyl groups of the solid. The calcining step in the modification of the refractory materials is accomplished by heating the resulting silylated solid at a temperature and for a time sufficient to remove substantially all of any introduced organic or halogen substituent. The steaming step in the modification of the refractory materials is accomplished by contacting the resulting calcined solid with an atmosphere containing at least 2 percent by volume of steam at a temperature of between about 900° F and about 1600° F for at least about ½ hour.

30 Claims, No Drawings

HYDROCARBON CONVERSION WITH MODIFIED SOLID CATALYST MATERIALS

CROSS-REFERENCE TO RELATED APPLICATION

This is a continuation of application Ser. No. 675,849, filed Apr. 12, 1976, now abandoned, which was a division of application Ser. No. 501,323, filed Aug. 28, 1974, now U.S. Pat. No. 3,980,586.

BACKGROUND OF THE INVENTION

1. Field of the Invention

This invention relates to organic compound conversion with modified refractory metal oxide solid catalyst materials. The modification of the refractory materials comprises the sequential steps of silylating, calcining and steaming.

2. Description of Prior Art

Crystalline aluminosilicate zeolites, modified by reaction with an organic substituted silane, have been described in U.S. Pat. No. 3,682,996 and in U.S. Pat. No. 3,698,157. The former of these patents describes, as novel compositions of matter, crystalline aluminosilicate esters made by reacting a crystalline aluminosilicate having an available hydrogen atom with an organic silane having a SiH group. The resulting compositions were disclosed as being catalysts useful for hydrocarbon processes, particularly hydrocracking. In the latter of the above patents, the use of ZSM-5 type crystalline aluminosilicate zeolites modified by treatment with an organic-radical substituted silane are described, together with the use of such modified zeolites in chromotographic separation of the compounds contained in a $C_8$ aromatic feed stock.

Other art showing modification of solid materials, i.e. zeolites, by silylation are U.S. Pat. No. 2,722,504 and McAteer et al., *Molecular Sieves*, A.C.S. Advances in Chemistry, Series 121, pages 258–265.

While the above-noted prior art is considered of interest in connection with the subject matter of the present invention, the modified refractory metal oxide catalyst materials used in the present process are unique in that they have undergone a modification procedure comprised of the sequential steps of silylating, calcining and steaming. The present modified solid materials have proven to be superior to similar materials not so modified in catalysis of organic compound conversion reactions. Such modified materials, the method of their modification and their use as organic compound conversion catalysts, insofar as is known, have not been heretofore disclosed.

SUMMARY OF THE INVENTION

In accordance with the present invention, there is provided organic compound conversion in the presence of modified refractory metal oxide solid catalyst materials having improved catalytic properties. Non-limiting examples of such solid materials so modified comprise oxides of metals of Groups IIIB, IVB, VB, or VIB of the Periodic Table, manganese, cobalt, iron, aluminum, boron, germanium, mixtures thereof or mixtures thereof with an oxide of silicon which have been silylated, calcined and steamed, in that order.

The modified solid materials for use in the present invention exhibit the desirable quality of being catalytically active for organic compound conversion. They are more catalytically active and have more desirable selectivities than the same solid materials which have not been modified by the sequential steps of silylating, calcining and steaming.

DESCRIPTION OF SPECIFIC EMBODIMENTS

The solid materials for use as catalysts in the present process after modification in accordance herewith include, as non-limiting examples, oxides of the following metals:
Group IIIB,
Group IVB,
Group VB,
Group VIB,
manganese,
cobalt,
iron,
aluminum,
boron,
germanium,
mixtures of the above with each other, or mixtures of the above with silicon.

More specifically, such non-limiting examples of the above solid materials for modification hereby include:
scandium oxide,
titanium oxide,
vanadium oxide,
chromium oxide,
molybdenum oxide,
manganese oxide,
iron oxide,
aluminum oxide,
boron oxide,
germanium oxide,
an oxide of the mixture comprised of aluminum and silicon,
an oxide of the mixture comprised of molybdenum and aluminum,
an oxide of the mixture comprised of aluminum and iron,
an oxide of the mixture comprised of aluminum and chromium,
an oxide of the mixture comprised of aluminum, cobalt and molybdenum, and others.

When an oxide is comprised of the mixture of aluminum and silicon, it may be in the form of silica-alumina, or an aluminosilicate, such as, for example, a crystalline aluminosilicate zeolite.

Although the solid materials embodied herein may be either amorphous or crystalline, when a crystalline aluminosilicate is employed as said solid material, it may be either a natural or synthetic zeolite. Representative of particularly preferred zeolites are zeolites X, Y, L, faujasite, erionite, mordenite, ZSM-4 and ZSM-5.

Synthetic zeolites have been generally described by Barrer in several publications and in U.S. Pat. Nos. 2,306,610 and 2,413,134. These materials are essentially the dehydrated forms of crystalline hydrous siliceous zeolites containing varying quantities of alkali metal and aluminum with or without other metals. The alkali metal atoms, silicon, aluminum and oxygen in these zeolites are arranged in the form of an aluminosilicate salt in a definite and consistent crystalline pattern. The structure contains a large number of small cavities, interconnected by a number of holes or channels. These cavities and channels are precisely uniform in size.

In general, the process for preparing such alkali metal aluminosilicates, not including ZSM-4 or ZSM-5, hereinafter discussed in particular, involves heating, in aqueous solution, an appropriate mixture of oxides, or of materials where chemical compositions can be completely represented as a mixture of alkali metal oxides, Al$_2$O$_3$, SiO$_2$ and H$_2$O at a temperature of approximately 100° C for periods of 15 minutes to 90 hours or more. The product, which crystallizes within this hot mixture is separated therefrom and water washed, until the water in equilibrium with the zeolite has a pH in the range of 9 to 12, and thereafter is dehydrated by heating.

A specific zeolite useful as the solid material to be modified in accordance herewith is zeolite ZSM-4, taught by Great Britain Patent publication No. 1,117,568, the disclosure of which is incorporated herein by reference. ZSM-4 is a relatively new zeolite which, in its as synthesized aluminosilicate form, has the following composition in the anhydrous state, expressed in terms of mole ratios of oxides:

$$0.9 \pm 0.2 \, M_{2/n}O : Al_2O_3 : 3{-}20 \, SiO_2$$

where M is a mixture of tetramethylammonium cations and alkali metal cations, especially sodium, where $n$ is the valence of M. Generally, the tetramethylammonium cations comprise between 1 and 50 percent of the cations in the as synthesized form.

Another zeolite useful as the solid material to be modified hereby is zeolite ZSM-5, taught by U.S. Pat. No. 3,702,886, the disclosure of which is incorporated herein by reference. Zeolite ZSM-5 is a crystalline aluminosilicate zeolite having a composition in terms of mole ratios of oxides in the anhydrous state as follows:

$$0.9 \pm 0.2 \, M_{2/n}O : Al_2O_3 : Y \, SiO_2$$

wherein M is at least one cation having a valence $n$ and Y is at least 5.

Whichever of the above solid materials is chosen for modification in accordance herewith and thereby be made useful as a catalyst in the present process, it is essential that it has from about 0.05 to about 5 surface hydroxyl groups per 100 square Angstroms of surface area at the time of modification. This is so because the surface hydroxyl groups are required for reaction with the silane.

The surface hydroxyl groups may be those naturally present on the solid material or may be those added by treatment to produce them. Treatments to so produce surface hydroxyl groups sufficient for the present requirements are available in the art. Examples of such treatments include treatment with water, sometimes with acid or base catalysis and sometimes at elevated temperature and/or pressure.

It is noted that many components, such as, for example, alkali metal or alkaline earth cations or compounds, noble metals and their compounds or halides can be present with the solid material before and/or after modification in accordance herewith without deleterious affect.

The modification procedure employed here significantly affects physical properties and catalytic activity and selectivity of the solid materials so modified in organic compound, e.g. hydrocarbon compound, conversions. This modification procedure is used herein to create catalytically active materials of unusual selectivity from less active and/or less selective materials.

Also, the solid material modified in accordance herewith and thereby made useful as a catalyst in the present process may be either amorphous or crystalline. Further, it may initially be either shape-selective or non-shape-selective.

The solid materials are modified by the sequential steps of silylating, calcining and steaming. The silylating step is carried out by contacting the solid material with an organic-radical or halogen substituted silane having the general formula:

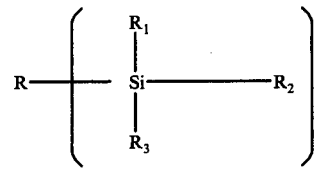

wherein $n$ is 1 or 2; and when $n$ is 2, R is a reactive member selected from the group consisting of amino or alkylamido of from 1 to about 30 carbon atoms, and R$_1$, R$_2$ and R$_3$ are members selected from the group consisting of R, hydrogen, hydroxy, halogen (e.g. fluoride, chloride, bromide and iodide), alkoxy of from 1 to about 30 carbon atoms, aryloxy, an organic radical which may include alkyl of from 1 to about 40 carbon atoms, alkyl or aryl carboxylic acid wherein the organic portion of the alkyl group contains from 1 to about 30 carbon atoms and the aryl group contains from 6 to about 24 carbon atoms, aryl of from 6 to about 24 carbon atoms and which may be further substituted, alkaryl and aralkyl of from 7 to about 30 carbon atoms and which may be further substituted; and when $n$ is 1, R is a reactive member selected from the group consisting of hydrogen, hydroxy, halogen, (e.g. fluoride, chloride, bromide and iodide), alkoxy of from 1 to about 30 carbon atoms, methyl, aryloxy, alkyl-substituted aryloxy wherein the alkyl portion thereof may have from 1 to about 30 carbon atoms and carboxy, and R$_1$, R$_2$ and R$_3$ are members selected from the group consisting of hydrogen, hydroxy, halogen (e.g. fluoride, chloride, bromide and iodide), alkoxy of from 1 to about 30 carbon atoms, aryloxy, alkyl-substituted aryloxy wherein the alkyl portion thereof may have from 1 to about 30 carbon atoms, alkyl of from 1 to about 40 carbon atoms, alkyl or aryl carboxylic acid wherein the organic portion of the alkyl group contains from 1 to about 30 carbon atoms and the aryl group contains from 6 to about 24 carbon atoms, aryl of from 6 to about 24 carbon atoms and which may be further substituted, alkaryl and aralkyl of from 7 to about 30 carbon atoms and which may be further substituted. Preferably, when $n$ is 2 and R$_1$, R$_2$ or R$_3$ is alkyl, said alkyl group or groups are from 1 to about 4 carbon atoms in chain length. Also, when $n$ is 1 and R is alkoxy, said alkoxy group has preferably from 1 to about 6 carbon atoms. Mixtures of the above compounds may likewise be used and may, in fact, be preferable from a commercial standpoint.

The silane employed may or may not be sufficiently large so as not to enter any pores of the solid material hereby modified. Silylation, therefore, may be within any pores and on outer surfaces of said solid material or only on the outer surfaces thereof, depending upon whether it is desired to modify only the external surface or both the external surface and the internal surface of the solid material.

Representative silanes, as non-limiting examples, for use herein include:
    trimethylsilane, dimethylsilane,
bis-(trimethylsilyl) acetamide,
silicon tetrachloride
dimethyl dichloro silane,
trimethyl chlorosilane, and
hexamethyl disilazane.

The selected silane and the solid material hereinabove defined are contacted at an elevated temperature to effect bonding between said silane and the surface hydroxyl groups of said solid material. Generally, the silane and the solid material are contacted on a weight basis of about 2 percent to about 200 percent silane based on the weight of solid material and preferably about 10 to about 100 percent, respectively. The amount of silane should desirably be such as to achieve about 1 to about 5 weight percent of $SiO_2$ bonded to the outer surface of solid material after the second step of calcination. For good contact between the reactants, it is preferable to employ a reaction medium or the silane as a gas. Satisfactory reaction media include the ethers, aliphatic hydrocarbons and halo-substituted aliphatic hydrocarbons of 5 to about 8 carbon atoms, aromatics and halo-substituted aromatic hydrocarbons. Acid or base catalysts may be employed, such as p-toluene-sulfonic acid or pyridine. When $n$ is 1 and R is hydrogen or methyl, silylation most preferably is done with the silane as a gas (without solvent medium) because of a higher temperature requirement.

An elevated temperature, generally between about 25° C and about 500° C, and more preferably from about 100° C to about 150° C, should be employed for the reaction. However, when $n$ is 1 and R is methyl or hydrogen, a temperature of from greater than 300° C to about 500° C is required. Usually, the reactants are charged to the medium, when used, and heated at the reflux point of the system for about 1 to about 10 hours. The mixture is then contacted with a volatile solvent such as chloroform or n-pentane, filtered and dried in an oven at a temperature of about 75° C to 125° C. The resulting modified solid material is considered to have the silane chemically bonded thereto.

The second step in the modification method for rendering a refractory solid material useful in the present process is calcining the silylated solid material. This is accomplished at a temperature and for a time sufficient to remove substantially all of any organic of halogen groups introduced to the solid material via the silylating step. Calcining herein involves heating the silylated solid material in an inert atmosphere, e.g. helium, or in an oxygen-containing atmosphere, e.g. air, to a temperature in the range of greater than about 350° C to about 700° C, and preferably between about 450° C and 550° C. The duration of the calcining step, of course, varies with the temperature employed from between about 30 minutes to about 20 hours. Programmed heating to about 540° C and holding at 540° C for about 10 hours is an embodiment of the calcining step providing highly effective.

The third step in the modification process is steaming the silylated/calcined solid material. This is accomplished by contacting the material with an atmosphere containing at least about 2 percent by volume of steam at a temperature between about 900° F and about 1600° F, preferably between about 1000° F and about 1400° F, for a period of at least about ½ hour and generally within the approximate range of from about ½ to about 5 hours.

It should be noted that when the solid material for modification hereby is an aluminosilicate, i.e. a crystalline aluminosilicate, the choice of time, temperature and water partial pressure for the steaming step of the present invention must not exceed certain limits for such material. Said limits, known to those skilled in the art, are established by the fact that certain crystalline aluminosilicates may suffer loss of crystallinity if steamed under conditions in excess thereof.

It is interesting to note that, if one desires, the calcining and steaming steps of this invention may be conducted during the same time period whereby, although both steps are physically started at the same time, the benefit of the calcining step is realized before the steaming benefit is imparted to the solid material. That is, the calcining operation removes substantially all of the introduced organic or halogen substituent prior to the steaming benefit being imparted to the solid material.

In practicing organic compound conversion with the modified solid materials of the present invention as catalysts, and especially if said solid material is a zeolite material, it may be desirable to incorporate it with a matrix or support material which is resistant to high temperatures or which imparts a degree of ease in handling said materials as catalysts. Such matrix materials include synthetic or naturally occurring substances such as clay, silica and/or metal oxides. The latter may be either naturally occurring or in the form of gelatinous precipitates or gels including mixtures of silica and metal oxides. Naturally occurring clays which can be composited with the modified solid materials include those of the montmorillonite and kaolin families, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the modified solid materials employed herein may be composited with a porous matrix material, such as silica, alumina, silica-alumina, silica-magnesia, silica-zirconia, silica-thoria, silica-berylia, silica-titania as well as ternary compositions such as silica-alumina-thoria, silica-alumina-zirconia, silica-alumina-magnesia and silica-magnesia-zirconia. The matrix may be in the form of a cogel. The relative proportions of finely divided modified solid material and inorganic oxide gel matrix may vary widely with the solid material content ranging from between about 1 to about 99 percent by weight and more usually in the range of about 5 to about 80 percent by weight of the composite.

The modified solid materials as above prepared are particularly suitable for use as catalysts in the conversion of organic compounds such as hydrocarbons. In particular, they find utility in catalytic cracking and hydrocracking operations as well as other similar type processes. Certain of the so modified solid materials may be impregnated with salts or ion exchanged with cations from Groups I-VIII of the Periodic Table which may subsequently be reduced if desired. They may also be used in such catalytic conversions of hydrocarbons as, for example, alkylation, dealkylation, transalkylation, isomerization, hydrogenation, dehydrogenation, dehydrohalogenation, dehydrocyclization, oxidation and the like.

In general, organic compounds may be catalytically converted in the presence of the modified solid materials over a range of catalytic conversion conditions, including a reaction temperature of from about 70° F to about 1200° F, preferably from about 450° F to about 1050° F, a reaction pressure of from atmospheric to about 4000 psig, preferably from atmospheric to about 2000 psig, and a hydrogen/hydrocarbon ratio of from 0 to about 12,000 scf/bbl, preferably from 0 to about 10,000 scf/bbl. When the conversion is conducted in a flow apparatus, e.g. a down-flow reactor, or under conditions comparable to those existing in a flow apparatus, the liquid hourly space velocity (LHSV) should be maintained at between about 0.1 hr$^{-1}$ and about 20 hr$^{-1}$, preferably between about 0.5 hr$^{-1}$ and about 10 hr$^{-1}$. When the conversion is conducted in a batch apparatus, e.g. a stirred batch reactor, or under conditions comparable to those existing in a batch apparatus, the contact time should be maintained at between about 0.5 hour and about 10 hours, preferably between about 0.1 hour and about 2 hours.

In particular, when the conversion of organic compound by the present method is cracking, catalytic conversion conditions should be maintained within certain critical ranges, including a temperature of from about 500° F to about 1200° F, preferably from about 700° F to about 1050° F, a pressure of from about atmospheric to about 500 psig, preferably from about atmospheric to about 50 psig, a LHSV (when a flow operation) of from about 0.1 hr$^{-1}$ to about 20 hr$^{-1}$, preferably from about 2 hr$^{-1}$ to about 15 hr$^{-1}$, and a contact time (when a batch operation) of from about 0.05 hour to about 10 hours, preferably from about 0.06 hour to about 0.5 hour. When the conversion is hydrocracking, catalytic conversion conditions should be maintained within somewhat different ranges, including a temperature of from about 450° F to about 1000° F, preferably from about 450° F to about 850° F, a pressure of from about 200 psig to about 4000 psig, preferably from about 200 psig to about 2000 psig, a LHSV (when a flow operation) of from about 0.1 hr$^{-1}$ to about 10 hr$^{-1}$, preferably from about 0.5 hr$^{-1}$ to about 10 hr$^{-1}$, a contact time (when a batch operation) of from about 0.1 hour to about 10 hours, preferably from about 0.1 hour to about 2 hours and a hydrogen/hydrocarbon ratio of from about 500 scf/bbl to about 12,000 scf/bbl, preferably from about 2000 scf/bbl to about 10,000 scf/bbl.

The following specific examples, not to be considered unduly limiting in description of the present invention, will serve to illustrate the invention.

EXAMPLE 1

A commercial type, conventional non-shape-selective, amorphous, silica-alumina cracking catalyst was chosen to be the solid material for modification hereby. This material had a SiO$_2$/Al$_2$O$_3$ ratio of about 9/1 and a surface area of 450 m$^2$/g.

A quantity of said material (20–30 mesh) was calcined by programmed heating in air to 538° C and holding at that temperature for 10 hours. After cooling to room temperature, a portion of said material was removed to be used in performance testing as an unmodified material for comparison purposes. The remainder (about 3 grams) of the material was then placed in a flask with 100 ml. xylene. Helium was gently bubbled through the mixture for mixing purposes and 2.0 ml. of N,O-bis-(trimethylsilyl) acetamide was added thereto. The mixture was then heated to reflux for 2 hours, cooled and held at room temperature for 16 hours. The thus silylated product was filtered out of the mixture, washed thoroughly with hexane and dried in air.

Samples (1.5 ml.) of the unmodified material and the silylated material were then tested by being placed into a vertical downflow reactor and heated under a helium flow of 26 ml./minute to 538° C. The silylated material sample was further heated to 593° C (1100° F), treated with 20 mm. Hg water vapor in helium for 45 minutes and then cooled back to 538° C. With the helium flow continuing, a 1:1:1 (by volume) mixture of n-hexane: 3-methylpentane: 2,3-dimethylbutane was passed over the catalyst samples at a rate of 0.8 ml/hour. Hydrocarbon product samples were periodically withdrawn for gas chromatography analysis. The results were as listed in Table I.

TABLE I

| Catalyst of Example 1 | Cracking Rate Constants[1] | | | Relative Rates | | |
|---|---|---|---|---|---|---|
| | DMB[3] | MP[4] | nHEX[5] | $^{nHEX}$/MP | $^{MP}$/DMB | $\alpha^{(2)}$ |
| unmodified | 5.37 × 10$^{-2}$ | 3.41 × 10$^{-2}$ | 5.49 × 10$^{-3}$ | 0.16 | 0.64 | 0.35 |
| modified | 5.6 × 10$^{-2}$ | 4.4 × 10$^{-2}$ | 2.3 × 10$^{-2}$ | 0.52 | 0.79 | 1.48 |

[1]Cracking rate constants in sec$^{-1}$.
[2]$\alpha$ is nHEX rate constant divided by 1.55 × 10$^{-2}$ sec$^{-1}$ and is a dimensionless parameter.
[3]DMB is 2,3-dimethylbutane.
[4]MP is 3-methylpentane.
[5]nHEX is n-hexane.

These results clearly show that the silylation/calcination/steaming modification increases the cracking of normal paraffin. This is exactly the type of behavior desired in a shape-selective cracking process in which the aim is to treat a hydrocarbon mixture so as to remove the maximum possible low octane normal paraffins while removing a minimal amount of the higher octane branched materials.

EXAMPLE 2

An amorphous, small-pore shape-selective solid material was prepared for the purpose of further demonstrating the present invention. In a suitable reactor, 50.9 grams of H$_2$NCH$_2$CH$_2$NHCH$_2$CH$_2$CH$_2$Si(OCH$_3$)$_3$, 3.35 grams of aluminum triethoxide and 10 ml. of pyridine were mixed with 50 ml. H$_2$O and 200 ml. of methanol and the mixture was heated to reflux for 16 hours. The solvent was stripped under vacuum and the product was calcined by programmed heating at 3° C per minute to 538° C, held at that temperature for 10 hours and cooled. The yield of solid material was approximately 47% and it had the following properties:

Al$_2$O$_3$ Content, wt. %:2.04
Surface Area, m$^2$/g:296

A quantity of the solid material of this example was modified as in Example 1 and a quantity was kept unmodified after initial programmed calcination. Samples (1.5 grams) of the unmodified and modified solid material were performance tested for catalytic activity in the same apparatus and by the same procedure as in Example 1. Hydrocarbon product samples were periodically withdrawn for gas chromatography analysis. The results were as listed in Table II.

TABLE II

| Catalyst of Example 2 | Cracking Rate Constants[1] | | | Relative Rates | | |
|---|---|---|---|---|---|---|
| | DMB[3] | MP[4] | nHEX[5] | nHEX/MP | MP/DMB | $\alpha$[2] |
| unmodified | $2.14 \times 10^{-2}$ | $1.47 \times 10^{-2}$ | $1.38 \times 10^{-2}$ | 0.90 | 0.67 | 0.89 |
| modified | 0 | $1.8 \times 10^{-2}$ | $2.54 \times 10^{-2}$ | 1.4 | — | 1.64 |

[1] Cracking rate constants in sec$^{-1}$.
[2] $\alpha$ is nHEX rate constant divided by $1.55 \times 10^{-2}$ sec$^{-1}$ and is a dimensionless parameter.
[3] DMB is 2,3-dimethylbutane.
[4] MP is 3-methylpentane.
[5] nHEX is n-hexane.

These results show that the silylation/calcination/steaming modification again increases the cracking of normal paraffin and, in this case, also decreases the cracking of branched paraffin, a desirable property in a shape-selective cracking process for octane improvement.

EXAMPLE 3

To 50 ml. xylene was added approximately 0.17 grams of a commercial NH$_4$Y zeolite containing cracking catalyst in 60/80 mesh, suitable for catalytic performance evaluation in the "pulse chromatographic gas oil cracking test", hereinafter described in detail. To the above mixture was then added 0.2 ml. bis-(trimethylsilyl) acetamide. This mixture was heated to reflux with moisture excluded by an Aquasorb tube for 16 hours and then cooled to room temperature. After thorough washing with hexane and drying in air, the solid material product hereof was placed into a large furnace on a porcelain dish and heated at 1° C/minute to 538° C, held at that temperature for about 15 hours and then allowed to cool to room temperature. A portion of the thus silylated and calcined solid material of this example was then steamed at 1400° F for 4 hours with 100% steam.

EXAMPLES 4, 5 AND 6

The solid material of Example 4 is, for convenience, the portion of the material of Example 3 which was not steamed, i.e. it was silylated and calcined only.

The solid material designated for Example 5 was comprised of a commerical NH$_4$Y zeolite containing cracking catalyst in fresh, uncalcined and unmodified form.

The solid material designated for Example 6 was comprised of a commercial NH$_4$Y zeolite containing cracking catalyst which had been steamed only. The steaming was accomplished at 1400° F for 4 hours with 100% steam.

Samples of solid materials from each of Examples 3, 4, 5 and 6 were performance evaluated in the "pulse chromatographic gas oil cracking test", with test results presented in Table III, following the test description below.

PULSE CHROMATOGRAPHIC CRACKING TEST

This test is carried out in a ⅛ inch thin-walled stainless steel reactor mounted in its own oven (capable of reaching 1100° F) and placed in a gas chromatograph oven just past the injection port. The end of the reactor is connected directly to a ten foot, ⅛ inch O.D. SE-30 gas chromatograph column (retention time is proportional to boiling point) for sample analysis. The sample coming from the gas chromatograph column goes directly into a flame ionization detector connected to an integrator. Approximately 20 mg. of 60/80 mesh solid material, as a catalyst, is placed in the reactor. The temperature is adjusted to 900° F, and the helium flow set at about 34.5 cc/minute through the reactor and into the analytical column. Then, one microliter pulses of gas oil are injected over the catalyst once an hour for approximately 24 hours.

To obtain an accurate analysis, two things have to be known: (1) the boiling point calibration and (2) the calibration of the integrator. By programming the column from room temperature to 300° C, during the hour after each injection, the product distribution is divided into three regions: light gases ($C_1$ to $C_4$), $C_5+$ to 430° F, and 430° F$^+$ gas oil. The locations of these cut points are determined by running a blend of paraffins from $C_5$ to $C_{20}$ with known boiling points and matching retention times.

Integrator response is determined by calibration with known blends of gasoline and gas oil. Three blends are prepared with the percentage of gas oil ranging from 34.3 to 56.2. The integrated area of the gas oil has to be weighted by a factor of 1.16 ($\pm 0.01$) in order to calculate the weight distribution.

Conversion is defined as:

Conversion = 100 − weight percent gas oil in product neglecting the coke formed. The rate constants for the catalysts ($K$) are determined by assuming second order reaction of gas oil. Thus:

$$K'' = \frac{1}{tP_o} \left( \frac{1}{f} - 1 \right)$$

where $t$ is the catalyst volume divided by the carrier gas flow rate, $P_o$ is the partial pressure of oil, and $f$ is the fraction of gas oil left for each pulse. Assuming the partial pressure of the gas oil for each pulse and the density of the catalysts tested are approximately constant, the rate constant expression reduces to:

$$K'' \text{ equals approximately } \frac{V}{C} \left( \frac{1}{f} - 1 \right)$$

where $V$ is the carrier flow rate in cc/minute, $f$ is the fraction of gas oil left and $C$ is the catalyst weight. $K''$ as a function of cumulative oil/gram catalyst can then be used to compare catalyst activity and aging. Cumulative oil/gram catalyst is a measure of the total oil pulsed over the catalyst per gram.

TABLE III

| Catalyst of Example | Wt. % Conversion | | % Gasoline Selectivity | | $K''(\times 10^{-3})$ | |
|---|---|---|---|---|---|---|
| | 2nd Pulse | 20th Pulse | 2nd Pulse | 20th Pulse | 2nd Pulse | 20th Pulse |
| 3 | 80 | 69 | 59 | 68 | 5.59 | 3.17 |
| 4 | 92 | 79 | 58 | 65 | 18.2 | 5.60 |

TABLE III-continued

| Catalyst of Example | Wt. % Conversion | | % Gasoline Selectivity | | K''(× 10⁻³) | |
|---|---|---|---|---|---|---|
| | 2nd Pulse | 20th Pulse | 2nd Pulse | 20th Pulse | 2nd Pulse | 20th Pulse |
| 5 | 94 | 59 | 56 | 63 | 18.3 | 1.78 |
| 6 | 69 | 58 | 65 | 71 | 2.63 | 1.70 |

It is noted from the data presented in Table III that the catalyst of Example 3 has the best balance of desirable properties. The catalysts of Examples 4 and 5 have higher initial activities, but (1) they age more rapidly, indicating possible excessive coke deposition which would create catalyst regeneration problems. Such rapid aging would be undesirable in catalytic cracking operations, and (2) they have the lowest gasoline selectivities, indicating possible waste of valuable feedstocks if placed in a commercial process.

The catalyst of Example 6 has a desirably low aging rate and high selectivity, but its overall activity is undesirably low.

What is claimed is:

1. The method of hydrocarbon compound catalytic conversion which comprises contacting said hydrocarbon compound with a refractory metal oxide solid material selected from the group consisting of alumina, silica-alumina and alumino-silicates under hydrocarbon compound conversion conditions, said refractory metal oxide solid material being characterized by the presence of surface hydroxyl groups and having been modified by being subjected to the sequential steps of silylating said solid material, calcining the product solid material of said silylating step and steaming the product solid material of said calcining step; said silylating step comprising contacting said solid material with an organic- or halogen-substituted silane at a temperature of between about 25° C and about 500° C to effect bonding between said silane and the surface hydroxyl groups of said solid material; said calcining step comprising heating the resulting solid material from said silylating step at a temperature of greater than about 350° C to about 700° C in an inert atmosphere or oxygen-containing atmosphere for from about 30 minutes to about 20 hours; and said steaming step comprising contacting the resulting solid material from said calcining step with an atmosphere containing at least 2 volume percent steam at a temperature of between about 900° F and about 1600° F for at least about one-half hour.

2. The method of claim 1 wherein said refractory metal oxide solid material is alumina.

3. The method of claim 1 wherein said refractory metal oxide solid material is silica-alumina.

4. The method of claim 1 wherein said refractory metal oxide solid material is aluminosilicate.

5. The method of claim 4 wherein said aluminosilicate is zeolite X, zeolite Y, zeolite L, zeolite ZSM-4, zeolite ZSM-5, faujasite, erionite or mordenite.

6. The method of claim 1 wherein the silylating step in the modification of the refractory metal oxide solid material comprises contacting said solid material with an organic- or halogen-substituted silane having the general formula:

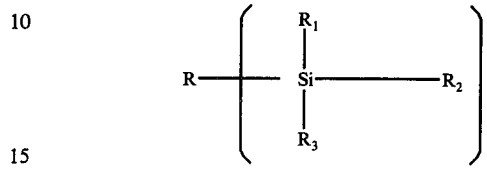

wherein $n$ is 1 or 2; and when $n$ is 2, R is a reactive member selected from the group consisting of amino and alkylamido of from 1 to about 30 carbon atoms, and $R_1$, $R_2$ and $R_3$ are members selected from the group consisting of R, hydrogen, hydroxy, halogen, alkoxy, of from 1 to about 30 carbon atoms, aryloxy, an organic radical which may include alkyl of from 1 to about 40 carbon atoms, alkyl or aryl carboxylic acid wherein the organic portion of the alkyl group contains from 1 to about 30 carbon atoms and the aryl group contains from 6 to 24 carbon atoms, aryl of from 6 to about 24 carbon atoms and which may be further substituted, alkaryl and aralkyl of from 7 to about 30 carbon atoms and which may be further substituted; and when $n$ is 1, R is a reactive member selected from the group consisting of hydrogen, hydroxy, halogen, alkoxy of from 1 to 30 carbon atoms, methyl, aryloxy, alkyl-substituted aryloxy wherein the alkyl portion thereof may have from 1 to about 30 carbon atoms and carboxy, and $R_1$, $R_2$ and $R_3$ are members selected from the group consisting of hydrogen, hydroxy, halogen, alkoxy of from 1 to about 30 carbon atoms, aryloxy, alkyl-substituted aryloxy wherein the alkyl portion thereof may have from 1 to about 30 carbon atoms, alkyl of from 1 to about 40 carbon atoms, alkyl or aryl carboxylic acid wherein the organic portion of the alkyl group contains from 1 to about 30 carbon atoms and the aryl group contains from 6 to about 24 carbon atoms, aryl of from 6 to about 24 carbon atoms and which may be further substituted, alkaryl and aralkyl of from 7 to about 30 carbon atoms and which may be further substituted.

7. The method of claim 6 wherein the silylating step in the modification of the refractory metal oxide solid material comprises contacting said solid material with a silane having the general formula as in claim 6 wherein $n$ is 1 and R is hydrogen or methyl, at a temperature of from greater than about 300° C to about 500° C.

8. The method of claim 6 wherein the calcining step in the modification of the refractory metal oxide solid material comprises heating the resulting solid material from said silylating step in an inert atmosphere or an oxygen-containing atmosphere for from about 30 minutes to about 20 hours.

9. The method of claim 8 wherein the calcining step in the modification of the refractory metal oxide solid material comprises heating to a temperature in the range of from about 450° C to about 550° C.

10. The method of claim 6 wherein the steaming step in the modification of the refractory metal oxide solid material is continued for from about ½ hour to about 5 hours at a temperature in the range of from about 1000° F to about 1400° F.

11. The method of claim 1 wherein said hydrocarbon compound conversion is conducted in a flow apparatus under conditions which include a temperature of from about 70° F to about 1200° F, a pressure of from about atmospheric to about 4000 psig and a liquid hourly spaced velocity of from about 0.1 hr$^{-1}$ to about 20 hr$^{-1}$.

12. The method of claim 1 wherein said hydrocarbon compound conversion is conducted in a batch apparatus under conditions which include a temperature of from about 70° F to about 1200° F, a pressure of from about atmospheric to about 4000 psig and a contact time of from about 0.05 hour to about 10 hours.

13. The method of claim 2 wherein said hydrocarbon compound conversion is conducted in a flow apparatus under conditions which include a temperature of from about 70° F to about 1200° F, a pressure of from about atmospheric to about 4000 psig and a liquid hourly spaced velocity of from about 0.1 hr$^{-1}$ to about 20 hr$^{-1}$.

14. The method of claim 2 wherein said hydrocarbon compound conversion is conducted in a batch apparatus under conditions which include a temperature of from about 70° F to about 1200° F, a pressure of from about atmospheric to about 4000 psig and a contact time of from about 0.05 hour to about 10 hours.

15. The method of claim 3 wherein said hydrocarbon compound conversion is conducted in a flow apparatus under conditions which include a temperature of from about 70° F to about 1200° F, a pressure of from about atmospheric to about 4000 psig and a liquid hourly spaced velocity of from about 0.1 hr$^{-1}$ to about 20 hr$^{-1}$.

16. The method of claim 3 wherein said hydrocarbon compound conversion is conducted in a batch apparatus under conditions which include a temperature of from about 70° F to about 1200° F, a pressure of from about atmospheric to about 4000 psig and a contact time of from about 0.05 hour to about 10 hours.

17. The method of claim 4 wherein said hydrocarbon compound conversion is conducted in a flow apparatus under conditions which include a temperature of from about 70° F to about 1200° F, a pressure of from about atmospheric to about 4000 psig and a liquid hourly spaced velocity of from about 0.1 hr$^{-1}$ to about 20 hr$^{-1}$.

18. The method of claim 4 wherein said hydrocarbon compound conversion is conducted in a batch apparatus under conditions which include a temperature of from about 70° F to about 1200° F, a pressure of from about atmospheric to about 4000 psig and a contact time of from about 0.05 hour to about 10 hours.

19. The method of claim 5 wherein said hydrocarbon compound conversion is conducted in a flow apparatus under conditions which include a temperature of from about 70° F to about 1200° F, a pressure of from about atmospheric to about 4000 psig and a liquid hourly space velocity of from about 0.1 hr$^{-1}$ to about 20 hr$^{-1}$.

20. The method of claim 5 wherein said hydrocarbon compound conversion is conducted in a batch apparatus under conditions which include a temperature of from about 70° F to about 1200° F, a pressure of from about atmospheric to about 4000 psig and a contact time of from about 0.05 hour to about 10 hours.

21. The method of claim 6 wherein said hydrocarbon compound conversion is conducted in a flow apparatus under conditions which include a temperature of from about 70° F to about 1200° F, a pressure of from about atmospheric to about 4000 psig and a liquid hourly space velocity of from about 0.1 hr$^{-1}$ to about 20 hr$^{-1}$.

22. The method of claim 6 wherein said hydrocarbon compound conversion is conducted in a batch apparatus under conditions, which include a temperature of from about 70° F to about 1200° F, a pressure of from about atmospheric to about 4000 psig and a contact time of from about 0.05 hour to about 10 hours.

23. The method of claim 8 wherein said hydrocarbon compound conversion is conducted in a flow apparatus under conditions which include a temperature of from about 70° F to about 1200° F, a pressure of from about atmospheric to about 4000 psig and a liquid hourly space velocity of from about 0.1 hr$^{-1}$ to about 20 hr$^{-1}$.

24. The method of claim 8 wherein said hydrocarbon compound conversion is conducted in a batch apparatus under conditions which include a temperature of from about 70° F to about 1200° F, a pressure of from about atmospheric to about 4000 psig and a contact time of from about 0.05 hour to about 10 hours.

25. The method of claim 10 wherein said hyrocarbon compound conversion is conducted in a flow apparatus under conditions which include a temperature of from about 70° F to about 1200° F, a pressure of from about atmospheric to about 4000 psig and a liquid hourly spaced velocity of from about 0.1 hr$^{-1}$ to about 20 hr$^{-1}$.

26. The method of claim 10 wherein said hydrocarbon compound conversion is conducted in a batch apparatus under conditions which include a temperature of from about 70° F to about 1200° F, a pressure of from about atmospheric to about 4000 psig and a contact time of from about 0.05 hour to about 10 hours.

27. The method of claim 11 wherein said conversion is cracking under conditions which include a temperature of from about 500° F to about 1200° F, a pressure of from atmospheric to about 500 psig and a liquid hourly space velocity of from about 0.1 hr$^{-1}$ to about 20 hr$^{-1}$.

28. The method of claim 12 wherein said conversion is cracking under conditions which include a temperature of from about 500° F to about 1200° F, a pressure of from atmospheric to about 500 psig and a contact time of from about 0.05 hour to about 10 hours.

29. The method of claim 11 wherein said conversion is hydrocracking under conditions which include a temperature of from about 450° F to about 1000° F, a pressure of from about 200 psig to about 4000 psig, a liquid hourly space velocity of from about 0.2 hr$^{-1}$ to about 10 hr$^{-1}$ to about 12,000 scf/bbl.

30. The method of claim 12 wherein said conversion is hydrocracking under conditions which include a temperature of from about 450° F to about 1000° F, a pressure of from about 200 psig to about 4000 psig, a contact time of from about 0.1 hour to about 10 hours and a hydrogen/hydrocarbon ratio of from about 500 scf/bbl to about 12,000 scf/bbl.

* * * * *

UNITED STATES PATENT AND TRADEMARK OFFICE
CERTIFICATE OF CORRECTION

PATENT NO. : 4,080,284
DATED : March 21, 1978
INVENTOR(S) : THOMAS OWEN MITCHELL It is certified that error appears in the above-identified patent and that said Letters Patent are hereby corrected as shown below:

Column 5, line 57, "providing" should read -- proving --.
Column 13, line 6, "spaced" should read -- space --.
Column 13, line 18, "spaced" should read -- space --.
Column 13, line 31, "spaced" should read -- space --.
Column 13, line 43, "spaced" should read -- space --.
Column 14, line 30, "spaced" should read -- space --.
Column 14, line 52, "0.2 $hr^{-1}$" should read -- 0.1 $hr^{-1}$ --.
Column 14, line 53, after "10 $hr^{-1}$" insert -- and a hydrogen/hydrocarbon ratio of from about 500 scf/bbl --.

Column 4, line 10, AND
Column 12, line 10 (Claim 6), the structural formula should read

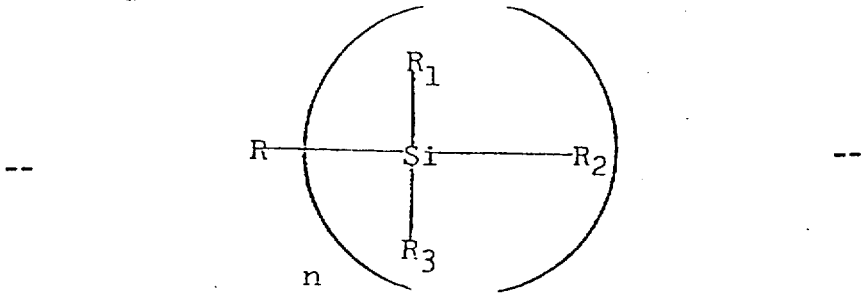

Signed and Sealed this

Fifth Day of September 1978

[SEAL]

Attest:

RUTH C. MASON
Attesting Officer

DONALD W. BANNER
Commissioner of Patents and Trademarks